United States Patent
DeGeronimo

(10) Patent No.: US 7,271,395 B2
(45) Date of Patent: Sep. 18, 2007

(54) DEVICE AND METHOD FOR THE MEASUREMENT OF DEPTH OF INTERACTION USING CO-PLANAR ELECTRODES

(75) Inventor: Gianluigi DeGeronimo, Syosset, NY (US)

(73) Assignee: Brookhaven Science Associates, LLC, Upton, NY (US)

( * ) Notice: Subject to any disclaimer, the term of this patent is extended or adjusted under 35 U.S.C. 154(b) by 294 days.

(21) Appl. No.: 11/174,241

(22) Filed: Jul. 5, 2005

(65) Prior Publication Data

US 2007/0007463 A1    Jan. 11, 2007

(51) Int. Cl.
G01T 1/24 (2006.01)
(52) U.S. Cl. .................. 250/382; 250/367; 250/370.1; 250/370.13; 250/370.09; 250/370.06
(58) Field of Classification Search ................ 250/367, 250/370.1, 370.13, 370.09, 370.06, 382
See application file for complete search history.

(56) References Cited

U.S. PATENT DOCUMENTS

| | | | |
|---|---|---|---|
| 5,777,338 A * | 7/1998 | He ........................... | 250/385.1 |
| 6,169,287 B1 | 1/2001 | Warburton | |
| 6,175,120 B1 | 1/2001 | McGregor et al. | |
| 6,218,668 B1 | 4/2001 | Luke | |
| 6,331,705 B1 * | 12/2001 | Eisen et al. ............ | 250/370.01 |
| 6,621,084 B1 | 9/2003 | Wainer et al. | |
| 6,740,885 B2 | 5/2004 | Wainer et al. | |
| 2005/0001213 A1 * | 1/2005 | Tindall et al. ................ | 257/52 |
| 2005/0139775 A1 * | 6/2005 | Gono et al. ............ | 250/370.09 |

OTHER PUBLICATIONS

M. Amman, et al., "Optimization Criteria for Coplanar-Grid Detectors," *IEEE Transactions on Nuclear Science*, 46:3 (Jun. 1999).
Z. He, et al., "1-D Position Sensitive Single Carrier Semiconductor Detectors," *Nuclear Instruments and Methods in Physics Research A* 380:228-231 (1996).
Z. He, et al., "Position-Sensitive Single Carrier CdZnTe Detectors," *Nuclear Instruments and Methods in Physics Research A* 388:180-185 (1997).
P.N. Luke, "Single-Polarity Charge Sensing in Ionization Detectors Using Coplanar Electrodes," *Appl. Phys. Lett.* 65:22 (Nov. 28, 1994).

* cited by examiner

*Primary Examiner*—Constantine Hannaher
*Assistant Examiner*—Djura Malevic
(74) *Attorney, Agent, or Firm*—Lori-Anne Neiger

(57) ABSTRACT

A device and method for measuring a depth of interaction of an ionizing event and improving resolution of a co-planar grid sensor (CPG) are provided. A time-of-occurrence is measured using a comparator to time the leading edge of the event pulse from the non-collecting or collecting grid. A difference signal between the grid signals obtained with a differential amplifier includes a pulse with a leading edge occurring at the time-of-detection, measured with another comparator. A timing difference between comparator outputs corresponds to the depth of interaction, calculated using a processor, which in turn weights the difference grid signal to improve spectral resolution of a CPG sensor. The device, which includes channels for grid inputs, may be integrated into an Application Specific Integrated Circuit. The combination of the device and sensor is included. An improved high-resolution CPG is provided, e.g., a gamma-ray Cadmium Zinc Telluride CPG sensor operating at room temperature.

25 Claims, 10 Drawing Sheets

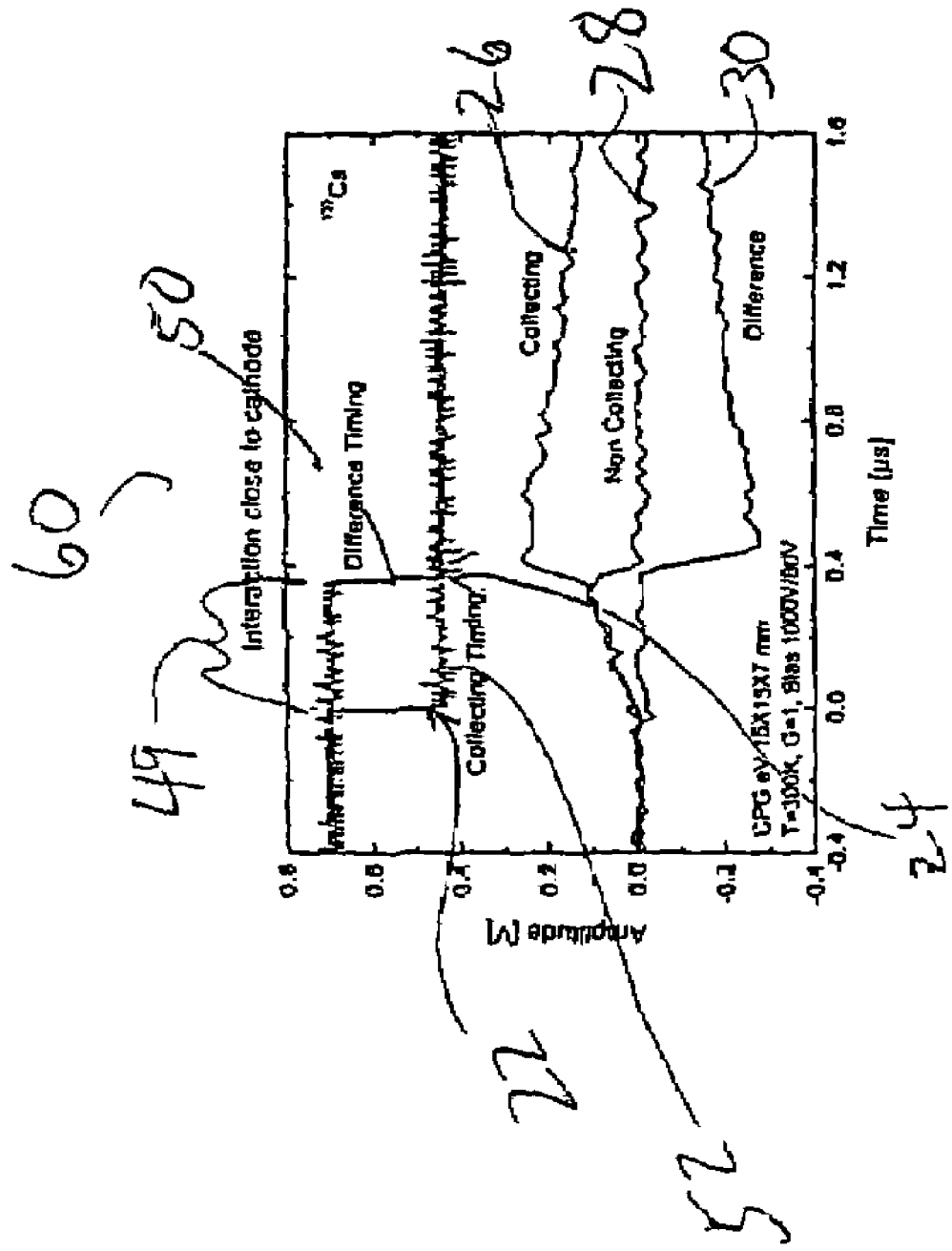

DEVICE AND METHOD FOR THE MEASUREMENT OF DEPTH OF INTERACTION USING CO-PLANAR ELECTRODES

This invention was made with Government support under contract number DE-AC02-98CH10886, awarded by the U.S. Department of Energy. The Government has certain rights in the invention.

FIELD OF THE INVENTION

The present invention relates to high-resolution co-planar grid sensors for gamma-ray detection, and more particularly, to a method and device for measuring the depth of interaction in co-planar grid sensors to increase resolution of detection.

BACKGROUND OF THE INVENTION

Compound semiconductor sensors, like the ones based on cadmium zinc telluride (CdZnTe) material, for example, are being considered in an increasing number of room-temperature gamma-ray detection applications. Though more convenient and practical when used at room-temperature, these sensors suffer a loss of signal to noise compared to conventionally cooled sensors. Several solutions have been proposed and some successfully adopted in order to compensate for the resulting substantial collection deficiency.

The charges, both electrons and holes, generated by the ionizing gamma radiation are subject to substantial trapping effects. Typically, the holes are limited by a much shorter trapping length compared to the electrons; therefore, their contribution to the induction of charge on the electrodes is negligible and subsequently, the induction depends strongly on the electrons. This dependence on the electrons makes the signals induced on the electrodes strongly dependent on the depth of the ionizing interaction, leading to relevant degradation of spectral signal resolution. Therefore, there is a need for an electrode configuration that makes a device that is sensitive to one kind of charge only, but with a resolution that is independent of the depth of the interaction. Several devices have been proposed in the prior art with some success in an attempt to address this need.

Referring to FIG. 1, a co-planar grids sensor (CPG) 10 was introduced in 1994, as described in P. N. Luke, "Single-Polarity Charge Sensing in Ionization Detectors Using Coplanar Electrodes," Appl. Phys. Lett. 65:22 (Nov. 28, 1994), which is incorporated herein by reference. A CPG 10 includes a cathode 12, and an anode side 14. The anode side 14 includes two co-planar interdigitally connected grids in place of the conventional single electrode. One of the grids is a collecting grid 16 and the other is a non-collecting grid 18. A small bias voltage is applied across the collecting 16 and non-collecting grid 18 so that all the electrons in proximity of the grids are collected substantially only by the collecting grid 16. As in a conventional single planar electrode device, a high voltage supply supplies a high voltage to the cathode electrode 12, thus generating an electric field in the bulk of the compound semiconductor 23.

When charges (electrons and holes) are generated by an ionizing event 20 at a time of occurrence 22, the electrons move in the bulk 23 of the sensor 10 towards the grids 14, and the much slower holes move toward the cathode 12. An identical signal is initially induced, therefore, on each of the two grid electrodes 16 and 18, as well as on the cathode 12. Once the electrons are in a near vicinity of the grids, they are pulled toward and collected by the collecting grid 16, so that after a time of detection 24, the signals differ. A collecting grid signal 26 and a non-collecting grid signal 28 over a collecting time are compared and a difference signal 30 between the collecting grid 26 and non-collecting grid 28 signals is observed. Since the difference induction occurs only when the electrons are in proximity of the grids, the difference signal 30 is, in a first order, independent of the depth of interaction.

The depth of interaction as used herein refers to a distance of an event from the anode side 14. Therefore, a deep-interacting event 32 is characterized as an ionizing event occurring close to the cathode 12, while a non-deep-interacting event 34 is characterized as an ionizing event close to the grids 14.

By making the detector insensitive to the electrons and holes traveling in the bulk, the resolving capability of this type of CPG sensor is greatly enhanced. On the other hand, the conventional CPG sensor is still limited by the trapping of the electrons in the bulk. The longer the electrons travel in the bulk before they are collected by the grid, the higher is the amount of trapping. Consequently, the charge associated with an ionizing event still shows a residual dependence on the depth of interaction that can substantially limit the resolution of the detector. The effect of trapping is shown with solid lines 36 in the signals of FIG. 1, and can be compared to the ideal case of no trapping effects shown with dotted lines 38. As can be seen in FIG. 1, the conventional CPG sensor does not compensate for the residual deficit in pulse height due to the residual trapping effect on the electrons.

In the prior art, two techniques have been proposed to apply to CPG sensor technology to compensate for the electron trapping effect. One method, referred to as the relative gain compensation technique, includes lowering the gain of the non-collecting grid below unity relative to that of the collecting grid. The other method, referred to as a cathode amplitude signal technique includes keeping the gain at unity and weighting each event by measuring its depth of interaction through measurement of the amplitude of the cathode signals.

The relative gain compensation technique essentially re-introduces a small amount of induction from the electrons traveling in the bulk back into the sensor system. The amplitude of the deep-interacting events is increased, while the one of the non-deep-interacting events is reduced, resulting in a first order compensation of the trapping effects. The optimum value of the relative gain typically ranges between 0.6 and 0.9, depending on the quality of the sensor, on the bias voltage and on the temperature. The gain is normally set by modifying the value of a passive element in the differential amplifier, i.e., a resistor.

Though the relative gain compensation technique advantageously does not require complex electronics, the correction is roughly linear, providing only a first order compensation for the trapping effects. As a result, the method is limited to a small amount of achievable compensation and thus the sensor resolution is minimally improved. A second disadvantage is that, if the relative gain needs to be modified, for example, due to replacement of the sensor or a change in voltage and/or temperature, a hardware change is needed, which is impractical especially for commercial applications.

The cathode amplitude signals technique consists of measuring, along with the amplitude of the difference signal, the amplitude of the cathode signal. By calculating the ratio between the difference and the cathode amplitudes, it is possible to extract the depth of the interaction of the event.

The difference signal of the event can be corrected (weighted) for the trapping effect according to the value of the associated depth of interaction. The optimum weighting parameters depend on the quality of the sensor, on the bias voltage and on the temperature.

This technique allows a higher order compensation of the trapping effects, thus achieving a better resolution when compared to the previous technique. A second advantage is that the optimization can be performed via software, with straightforward practical consequences. However, more complex electronics are disadvantageously required, including an additional front-end channel for processing the cathode signal, as well as large and bulky high voltage capacitors for coupling the high voltage cathode to the front-end electronics.

There is a need, therefore, for an efficient method and device for measuring the depth of interaction in co-planar grid sensors to increase resolution of detection without the addition of complex and bulky electronics.

SUMMARY OF THE INVENTION

The present invention, which addresses the needs of the prior art, relates to an efficient method and device for measuring the depth of interaction in co-planar electrode sensors such as a co-planar grid sensor (CPG) to increase resolution of detection without the addition of complex and bulky electronics. Therefore, the present invention also provides an efficient high spectral resolution device for use in detecting ionizing radiation, which may be used at room-temperature.

A method of the present invention for measuring a depth of interaction of an ionizing event using a co-planar collecting electrode and a non-collecting electrode includes obtaining a difference in time between a time of detection (or arrival) of a charge generated by the event at the collecting electrode and a time of occurrence of the event, as detected by the collecting or non-collecting electrode; and calculating the depth of interaction from the difference in time.

The method may be adapted to provide a high-resolution ionizing radiation sensor, where the method further includes weighting a difference signal, obtained by measuring a difference between the collecting and non-collecting electrode signal, by the depth of interaction to improve a spectral resolution of detection of the ionizing event.

A device of the present invention for measuring a depth of interaction of an ionizing event, using a co-planar anode electrode sensor including a coplanar non-collecting electrode and a collecting electrode, includes a first channel for inputting a collecting electrode signal from a collecting electrode, and a second channel for inputting a non-collecting electrode signal from a non-collecting electrode. The collecting electrode signal includes an event pulse including an event leading edge occurring at a time of occurrence of an ionizing event.

The device further includes a differential amplifier operatively connected to the first channel and the second channel. An output from the differential amplifier provides a difference signal between the non-collecting electrode signal and the collecting electrode signal. The difference signal includes a difference pulse having a leading edge occurring at a time of detection of a charge generated in response to the ionizing event. The device additionally includes a first comparator operatively connected to the collecting electrode and a first threshold control, which provides a first threshold reference level adjusted to correspond to the event leading edge. The first comparator outputs a first time at which the collecting electrode signal crosses the first threshold reference level, where the first time corresponds to the time of occurrence. A second comparator in the device is operatively connected to the output of the differential amplifier and a second threshold reference level adjusted to correspond to the leading edge of the difference pulse. The second comparator outputs a second time at which the difference signal crosses the second threshold reference level, where the second time corresponds to the time of detection.

The device may be integrated into an Application Specific Integrated Circuit.

The device may also include a processor for calculating a timing difference, wherein the timing difference equals the second time minus the first time, and for calculating the depth of interaction of the ionizing event from the timing difference, wherein the processor further weights the difference signal by the calculated depth of interaction to improve a spectral resolution of the co-planar anode electrode sensor.

The present invention also includes a high-resolution ionizing detector device including a combination of a co-planar anode electrode sensor, and a device for measuring a depth of interaction of an ionizing event using the co-planar anode electrode sensor. The sensor includes a non-collecting anode electrode, a collecting anode electrode, a cathode, and a substrate, where an ionizing event occurs at a depth of interaction in the substrate. The non-collecting anode electrode and the collecting anode electrode are co-planar, and a charge generated by the ionizing event is collected at the collecting anode electrode.

The device of the combination includes a first channel for inputting a collecting electrode signal from the collecting electrode, and a second channel for inputting a non-collecting electrode signal from the non-collecting electrode. The collecting electrode signal includes an event pulse including an event leading edge occurring at a time of occurrence of an ionizing event.

The device of the combination further includes a differential amplifier operatively connected to the first channel and the second channel. An output from the differential amplifier provides a difference signal between the non-collecting electrode signal and the collecting electrode signal. The difference signal includes a difference pulse having a leading edge occurring at a time of detection of a charge generated in response to the ionizing event. The device additionally includes a first comparator operatively connected to the collecting electrode and a first threshold control, which provides a first threshold reference level adjusted to correspond to the event leading edge. The first comparator outputs a first time at which the collecting electrode signal crosses the first threshold reference level, where the first time corresponds to the time of occurrence. A second comparator in the device is operatively connected to the output of the differential amplifier and a second threshold reference level adjusted to correspond to the leading edge of the difference pulse. The second comparator outputs a second time at which the difference signal crosses the second threshold reference level, where the second time corresponds to the time of detection.

The collecting electrode of the sensor may be a collecting grid and the non-collecting electrode a non-collecting grid in a co-planar grid (CPG) sensor, which provides the input signals to the channels of the device.

The device may be used to produce a high-resolution co-planar grid sensor operating at room temperature for the detection of, for example, gamma ray events.

The substrate of the sensor may be a semiconductor. Examples of useful semiconductors include Cadmium Zinc Telluride, Cadmium Telluride and Mercuric Iodide.

BRIEF DESCRIPTION OF THE DRAWINGS

FIG. 3A is a plot of results of an experiment for detection of an ionizing event close to the cathode of a CPG sensor using the device of FIG. 2.

DETAILED DESCRIPTION OF THE INVENTION

The present invention provides an efficient method and device for measuring the depth of interaction of ionizing radiation in co-planar electrode sensors, in particular, co-planar grid sensors, to increase resolution of detection. In addition, an efficient high spectral resolution device for detecting ionizing radiation at room temperature is provided.

Figure 1:
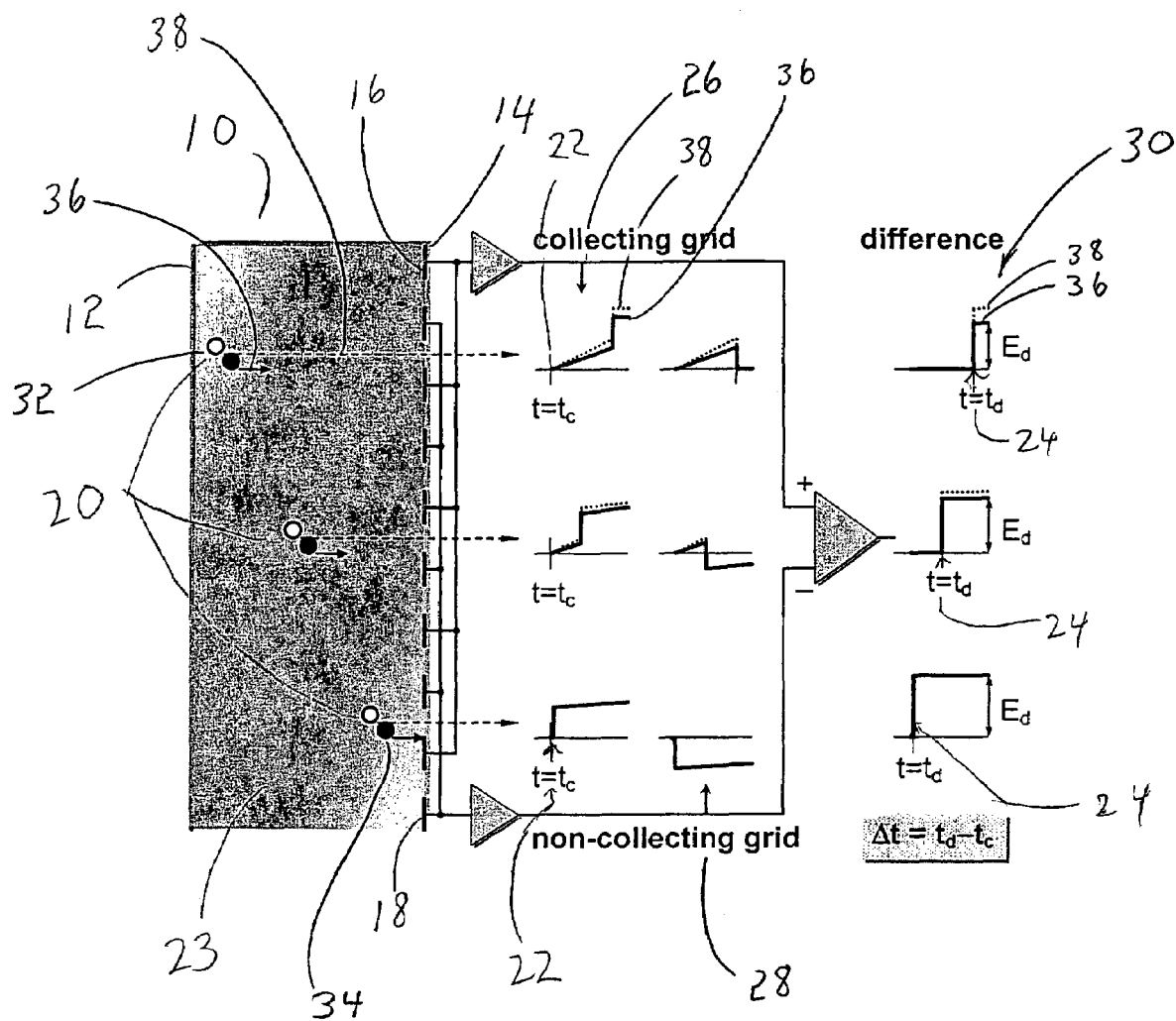
FIG. 1 is a schematic of a conventional prior art co-planar grids (CPG) sensor.

Referring to FIG. 1, the present invention provides a method and device for measuring a depth of interaction of an ionizing radiation (e.g., gamma ray, x-ray, or neutron) event by using timing information from co-planar anode electrode signals only. Any co-planar electrode configuration, which includes at least one collecting anode and one non-collecting anode of suitable shape and dimension as known to those skilled in the art, may be used to provide the collecting and non-collecting signals. In a preferred embodiment shown in FIG. 1, the collecting anode is a collecting grid and the non-collecting electrode is a non-collecting grid. Each grid includes multiple electrode fingers. The collecting grid fingers are interleaved with the non-collecting grid fingers, forming multiple adjacent pairs of co-planar non-collecting/collecting anode surfaces.

Referring to FIG. 1, the method includes obtaining a difference signal 30 between a non-collecting grid 18 and a collecting grid 16. A difference in time, i.e., a timing difference, is then preferably measured between a leading edge of a collecting grid signal and of the difference signal 30. The timing difference corresponds to the depth of interaction. The difference signal 30 corresponding to the ionizing event can then be corrected (weighted) for the trapping effect according to the value of the associated depth of interaction.

One skilled in the art will recognize that the difference in time may also be measured between a leading edge of a non-collecting grid signal and the difference signal 30 using the method of the present invention. In either case, the depth of interaction may be advantageously calculated using only one collecting electrode and one non-collecting electrode, which are co-planar.

Figure 2:
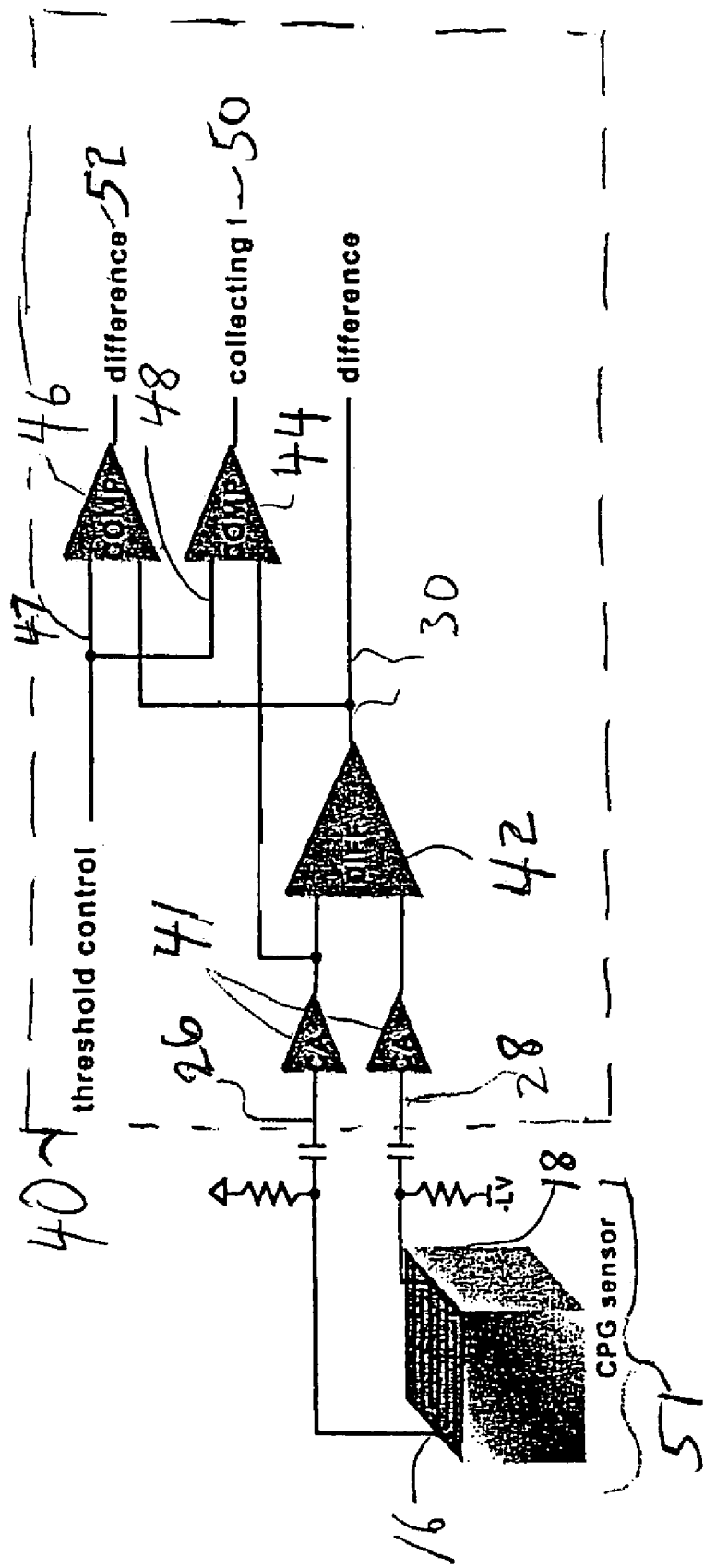
FIG. 2 is an embodiment of a device of the present invention for measuring depth of interaction from a CPG sensor.

One embodiment of a device 40 of the present invention for providing a measurement of the depth of interaction is shown in FIG. 2. The device 40 provides two channels for inputting the collecting grid signal 26 and the non-collecting grid signal 28. The device 40 may include various front-end electronics, including charge amplifiers 41 to process the raw grid signals 26 and 28.

Referring also to FIG. 1, an ionizing event generates a pulse signal corresponding to each of the collecting grid 26 and the non-collecting grid 28, where a leading edge of each pulse corresponds to the time of occurrence of the event 22 $t_c$. The two signals 26 and 28 are identical until the charge generated by the event is very close to the grids. At some trivial distance from the grids, the charge is pulled toward the collecting grid 16, so that immediately after a time of detection 24 $t_d$, the signals differ.

The device 40 of the present invention includes a differential amplifier 42 to provide the difference signal 30 between these input signals 26 and 28 by operatively connecting the collecting grid 16 and the non-collecting grid 18 to the differential amplifier 42. The collecting grid 16 is also operatively connected to a first comparator 44. The first comparator 44, in cooperation with a threshold control 47 to provide a first threshold reference level, uses the collecting grid signal 26 to measure a first time $t_c$ 22 corresponding to a time of occurrence of the ionizing event occurring at some depth inside the substrate 23 relative to the grid 16.

An output of the differential amplifier 42 is operatively connected to a second comparator 46. The second comparator 46 measures a second time $t_d$ 24 corresponding to a time of detection of the charge occurring once it is very near the grid 16. The second time 24 is measured from the difference signal 30, in cooperation with a threshold control 48 to provide a second threshold reference level as input to the second comparator 46.

The threshold control levels to each comparator 47 and 48 are adjusted, as is well-known to those skilled in the art, to provide a zero or other threshold crossing of the collecting grid signal 26 and the difference signal 30. The first threshold reference level and the second reference level may be the same and simultaneously adjustable, or may be provided as separate inputs. In this way, a measure of time of occurrence $t_c$ 22 of the event at some depth or distance from the grid 16 is provided by the first timing signal 50 at the output of the first comparator 44. A measure of time $t_d$ 24 corresponding to the charge at the grid 16 is then provided by the second timing signal 52 output from the second comparator 46. The timing difference $t_d$–$t_c$ between the first timing signal 50 and the second timing signal corresponds to the depth of interaction.

In another embodiment, the non-collecting grid signal 28 is used in the place of the collecting grid signal 26 to the comparator 44 and a first threshold crossing measured according to means known to those skilled in the art to provide the time of occurrence $t_c$ 22.

In case of the deep-interacting events 32 (ionizing events close to the cathode 12), the associated timing difference $t_d-t_c$ is large, while in the case of the non-deep-interacting events 34 close to the grids the timing difference is small. Therefore, a high resolution is achieved according to a method and device 40 of the present invention without the associated disadvantages of additional electronic channel and bulk coupling capacitors characteristic of the prior art.

A high-resolution co-planar grid sensor device of the present invention, therefore, includes a combination of the device 40 and a CPG sensor 51 including the collecting grid 16 and the non-collecting grid 18.

Referring to FIG. 3A, experimental results 60 using the circuit 40 with a CPG sensor is provided for interactions close to the cathode, i.e., deep-interacting events. A timing difference, $t_d-t_c$ 49, on the order of hundreds of nanoseconds can be observed. Referring also to FIG. 2, as described above, the first timing signal 50 (time of occurrence) and the second timing signal (time of detection) 52 were obtained by inputting the collecting grid 26 and non-collecting grid signals 28 into the differential amplifier 42, preferably after processing by front-end electronics including the charge amplifiers 41 to obtain the difference signal 30.

Figure 3B:
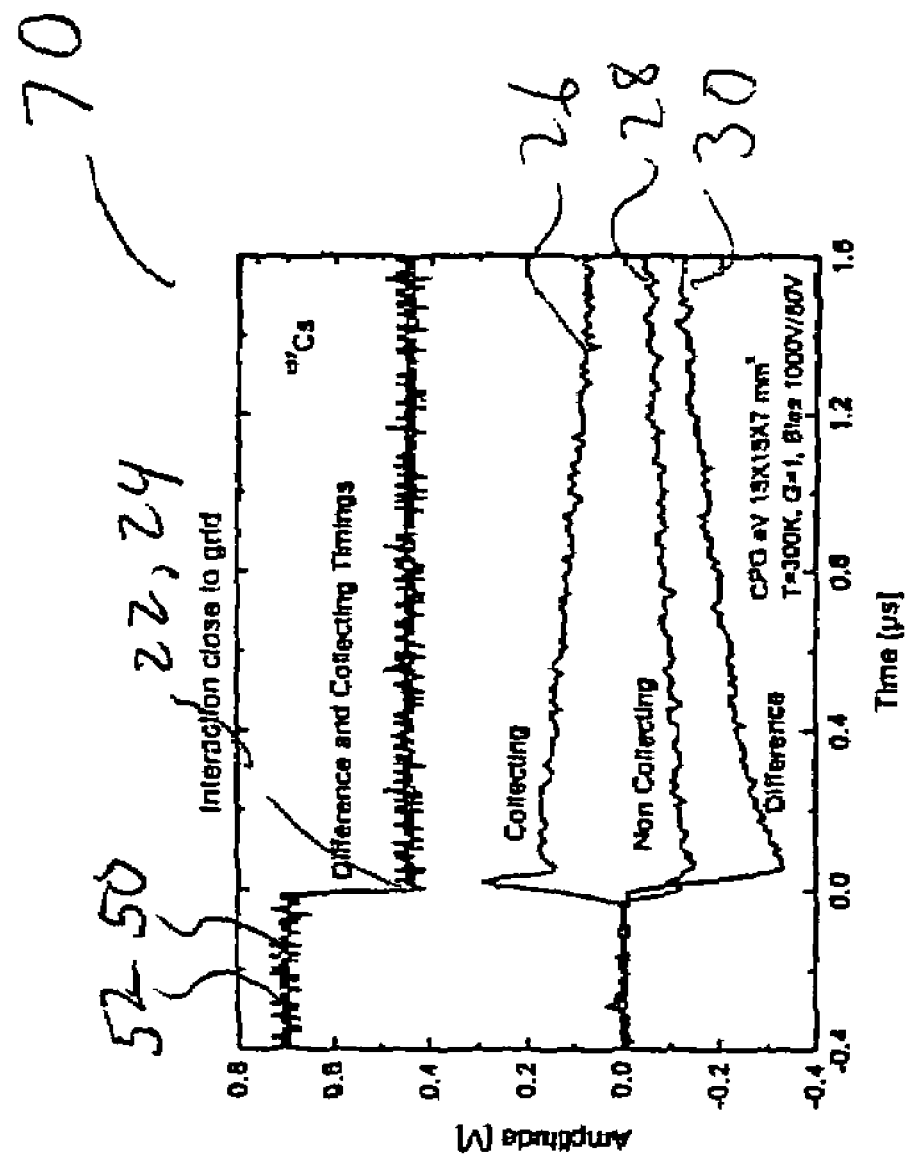
FIG. 3B is a plot of results of an experiment for detection of an ionizing event close to the grids of a CPG sensor using the device of FIG. 2.

FIG. 3B provides experimental data 70 for interactions close to the grids. In this case, which corresponds to non-deep-interacting events, a negligible timing difference 72 is observed.

The CPG device of the present invention provides a compact and efficient solution for large-volume room-temperature ionizing radiation sensors, such as Gamma-ray detectors and spectrometers. The device is particularly useful for applications ranging from nuclear material safeguard to radioisotope identification in security and defense, environmental remediation, well logging, medical diagnostics, and gamma-ray astronomy.

In one embodiment, therefore, the present invention includes a compact, efficient Application Specific Integrated Circuit (ASIC) that replaces discrete components including those in the device 40 to provide a measurement of the depth of interaction in a compact, efficient package. The availability of an ASIC for use with CPG sensors is especially beneficial in view of portable and battery operated detection systems.

Figure 4:
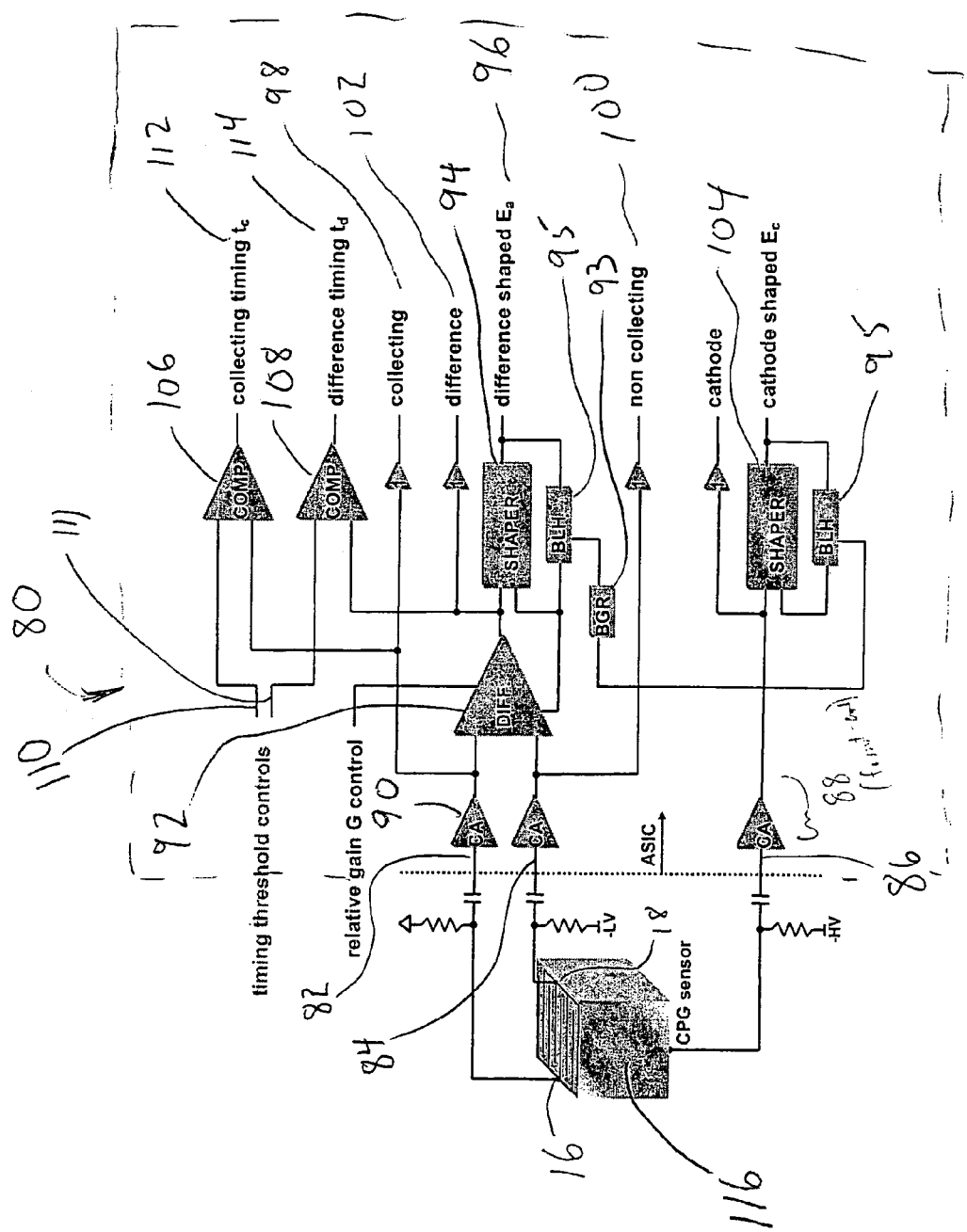
FIG. 4 is an electrical schematic representation of an embodiment of an ASIC of the present invention for measuring depth of interaction from a CPG sensor.

Referring to FIG. 4, one embodiment of an ASIC 80 of the present invention provides amplification of grid signals, the difference signal, and the first $t_c$ and second $t_d$ timing signals. Preferably, the ASIC also includes adjustable relative gain and high order filtering. Optionally, the ASIC 80 may also provide a measurement of the cathode signal. Thus, the ASIC 80 provides high sensitivity measurements by making use of the timing signals from the grid according to the present invention. In addition, the ASIC 80 can provide the capability to measure all signals of interest and provide electron trapping compensation according to previous techniques, such as the relative gain technique and cathode measurement technique discussed above.

Referring to FIG. 4, at least two front-end channels are provided, one 82 for the collecting grid signal, and one 84 for the non-collecting grid signal. An additional channel 86 may also be included for the cathode signal.

Each channel of the ASIC may include a test capacitor, preferably of about 500 fF, for external enablement through a dedicated switch (not shown). In one embodiment, gain can be switched, for example, between 36 mV/fC and 18 mV/fC, in order to cover an energy range up to at least 3 MeV.

The total dissipated power of an ASIC according to the present invention is preferably 25 mW or less from a single voltage supply, e.g., a +2.5V supply.

In one embodiment, the ASIC incorporates 0.25 µm technology, which may be provided, for example, by the Taiwan Semiconductor Manufacturing Company, 8 Li-Hsin Rd. VI, Hsinchu Science Park, Hsinchu, Taiwan 300-77, R.O.C. Dimensions of the ASIC are preferably 3.5×3.5 mm² or less.

Front-end stages 88 are preferably provided with a p-channel input device. Noise analysis and experimentation have demonstrated that due to the correlation associated with the inter-grid capacitance, the series input noise from the front-end can severely limit the resolution of this type of system. The series noise, dominated by the low-frequency component, was found to be 4-5 times lower using the p-channel device.

Preferably, the front-end electronics 88 include a low-noise p-channel charge amplifier (CA) 90, which is based on a dual-stage charge gain configuration to operatively connect each channel 82 and 84 to a differential amplifier (DA) 92. The differential amplifier 92 is designed, for example, to provide a relative gain of at least from about 0.4 to about 1.5, according to methods known to those skilled in the art.

Additional front-end electronics may also be included after each CA 90 to generate a first pole of a shaping amplifier 94, also referred to herein as a shaper 94, which filters and shapes the pulse signal output from the DA 92.

The shaper 94 is preferably a 5th order with complex conjugate poles and band-gap referenced baseline stabilizer [BLH] 95. A band-gap reference 93 stabilizes the baseline of the pulses for both shapers 94 and 104. The peaking time of the shaping amplifier ("shaper") 94 is appropriately chosen for the particular application, as those skilled in the art will appreciate. In one embodiment, the peaking time is selectable between about 1.2 µs and 2.4 µs. Consequently, the ASIC 80 is suitable for use even with CPG sensors affected by higher leakage currents (i.e. higher shot noise).

Buffers may also be provided (not shown) to make available to dedicated outputs: the unshaped signals after the first pole 96, the amplified collecting grid signal 98 and non-collecting grid signal 100, and their difference 102.

In addition, a similar shaping amplifier 104 is optionally provided to process the event pulse signal 86 input from the cathode. Though the ASIC 80 thus provides other options for compensating event data for depth of interaction according to prior art techniques using the cathode signal, measuring the timing of the collecting signal is preferable to measuring the cathode signal, as discussed above.

As provided in the discrete device 40, the ASIC includes a first comparator 106 and second comparator 108 with a first threshold control 110 and a second threshold control 111 respectively. In this way, a measure of the first time $t_c$ 22 (time of occurrence) is provided by a first timing signal 112 output from the first comparator 106 and a second time $t_d$ 24 (time of detection) is provided by a second timing signal 114 output from the second comparator 108. The threshold control reference level to each comparator is adjusted and set, as is well-known to those skilled in the art, to provide a zero or other threshold crossing of the collecting grid signal 82 and the difference signal 102 at the respective outputs of the comparators.

The timing difference $t_d-t_c$ between the collecting signal and the difference signal as measured at the output of the comparators is a measure of the depth of interaction and advantageously requires only the grid signals (collecting and difference) as input. The bi-parametric result is then used to compensate for the electron trapping. Therefore, no hardware adjustments are required to the CPG sensor and the technique can be applied during the acquisition via software. In addition, the method and device of the present invention does not require the additional cathode amplification and processing required for cathode measurement techniques, offering advantages in terms of power and area, especially by avoiding the need for bulky capacitors and resistors to couple the high-voltage cathode to the front-end.

Figure 5:
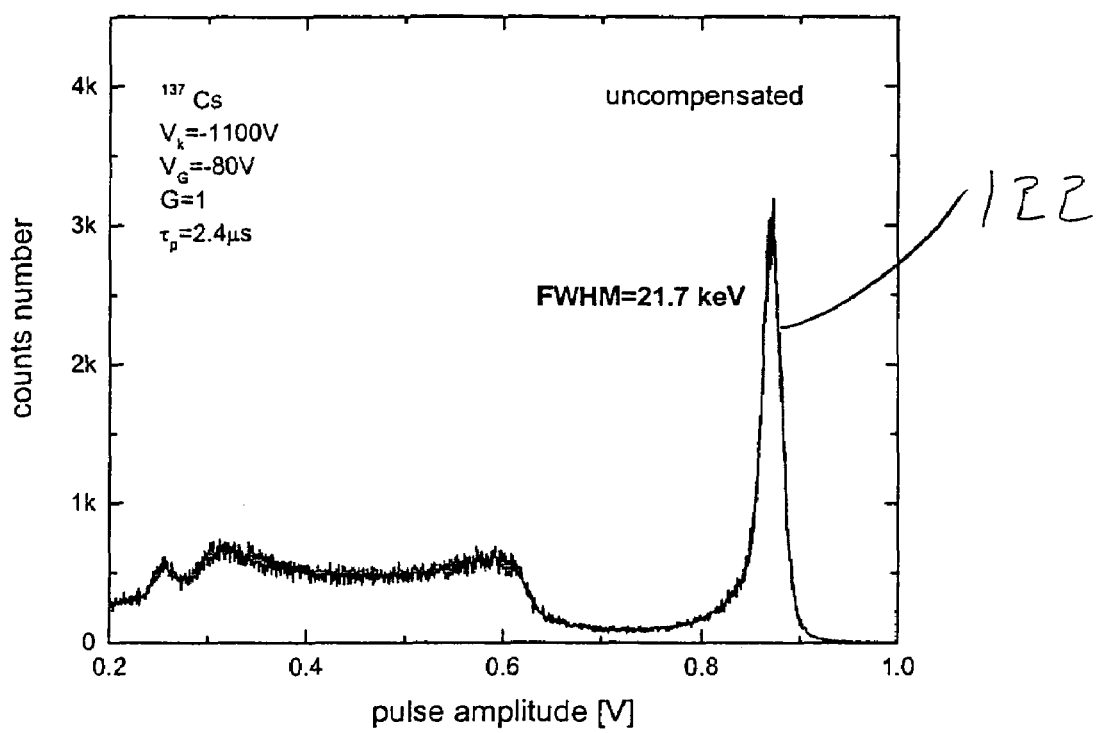
FIG. 5 is a plot of an uncompensated spectrum of a known Cesium (Cs) standard, $^{137}$Cs, using only the CPG shown in FIG. 4.

By a simple calculation, which may be performed on a digital signal processor as well-known to those skilled in the art, the depth of interaction d is calculated from the timing difference $t_d-t_c$ according to:

$$d=a(t_d-t_c), \quad (1)$$

where a is a weighting coefficient. Weighting of the difference signal to provide pulse height deficit correction is then performed, for example, by applying a linear equation for the compensation, such as:

$$E_{corr}=E_{meas}(1+b*d), \quad (2)$$

where b is a second weighting coefficient, $E_{meas}$ is the measured difference signal, and $E_{corr}$ is the resulting corrected difference signal obtained by weighting by the measured depth of interaction obtained from the present invention. Higher order equations may also be applied for the weighting operation according to means well-known to those skilled in the art. It is also possible to provide pulse height deficit correction that is an arbitrary function of the measured depth of interaction by doing a non-linear correction. Methods for providing correction to the difference signal are well-known to those skilled in the art and are discussed, for example, in: M. Amman, et al., "Optimization Criteria for Coplanar-Grid Detectors," *IEEE Trans. Nuc. Sci.*, Vol. 46, No. 3 (June 1999), last paragraph in Section II; Z. He, et al., "1-D Position Sensitive Single Carrier Semiconductor Detectors," *Nucl. Instr. and Meth. in Phys. Res. A*, 380:228-231 (1996), FIG. 5 and last paragraph in Section III; and Z. He, et al., "Position Sensitive Single CdZnTe Detectors," *Nucl. Instr. and Meth. in Phys. Res. A*, 388:180-185 (1997), Section II, which are incorporated herein by reference.

A high-resolution ionizing detection device according to the present invention includes either an embodiment of the device 40 having discrete components or an ASIC, such as the ASIC 80 of FIG. 4, which integrates the discrete components, in combination with a co-planar electrode sensor for detecting an ionizing event. As described above, the co-planar sensor preferably includes a collecting grid and a non-collecting grid, as well as a substrate and cathode. Preferably, electrons are detected, and the sensor is operated at room temperature.

The substrate includes any material capable of detecting an ionizing event. In one embodiment, the substrate includes a semiconductor.

Examples of semiconductors for use in the sensor include Cadmium Zinc Telluride, Cadmium Telluride and Mercuric Iodide.

Referring to FIG. 4 and FIGS. 5-8, experimental measurements of an energy spectrum of a known Cesium (Cs) standard, $^{137}Cs$, were performed using the ASIC 80 of the present invention coupled to a CPG sensor 116. For comparison, in FIG. 5, an uncompensated spectrum 120 for the $^{137}Cs$ standard was first recorded using only the sensor 116. As shown, a pulse 122 was measured to have a FWHM of about 21.6 keV.

Figure 6:
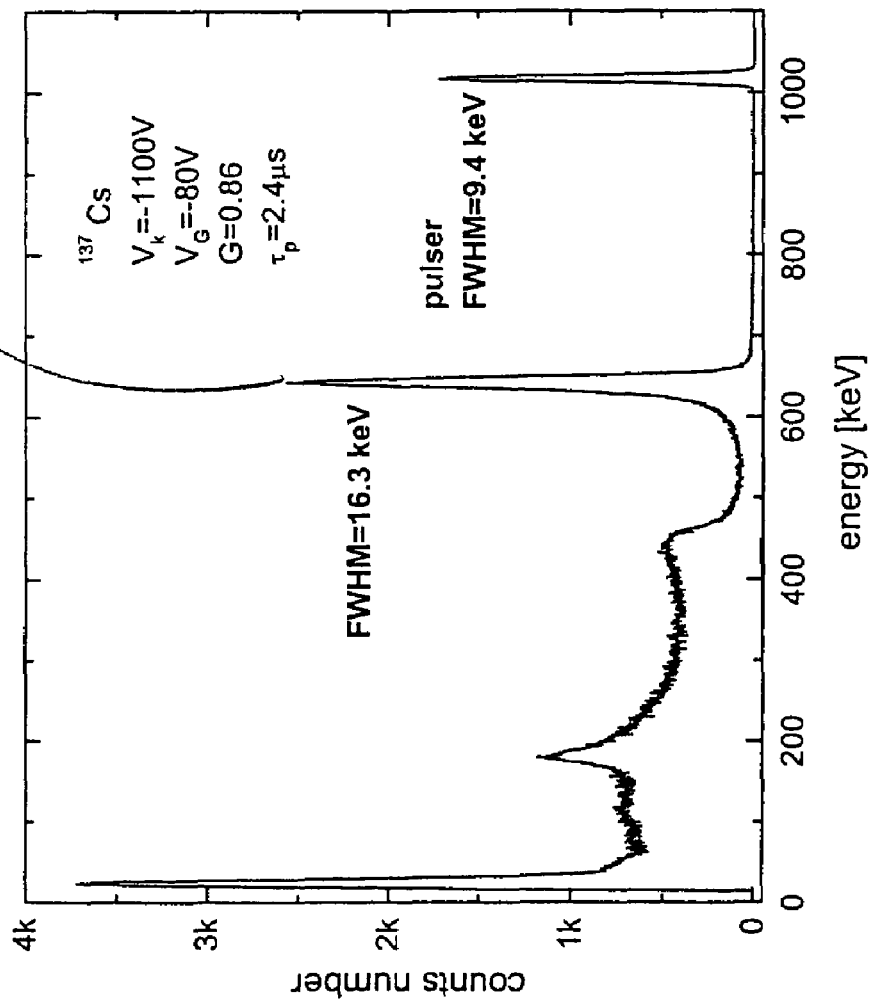
FIG. 6 is a plot of a measured spectrum of the $^{137}$Cs standard using the ASIC shown in FIG. 4, to apply the prior art relative gain compensation technique, which includes lowering the gain of the non-collecting grid below unity relative to that of the collecting grid.

As shown in FIG. 6, a spectrum 130 was also measured using the prior art relative gain compensation technique, which includes lowering the gain of the non-collecting grid below unity relative to that of the collecting grid. A peaking time of 2.4 µs was used. A full width half maximum (FWHM) of a pulse 132 centered at an energy of 662 keV corresponding to the $^{137}Cs$ was measured to be approximately 16.3 keV, with a contribution from the electronics of about 9.4 keV. With the sensor 116 unbiased, this contribution is about 6.9 keV.

Figure 7:
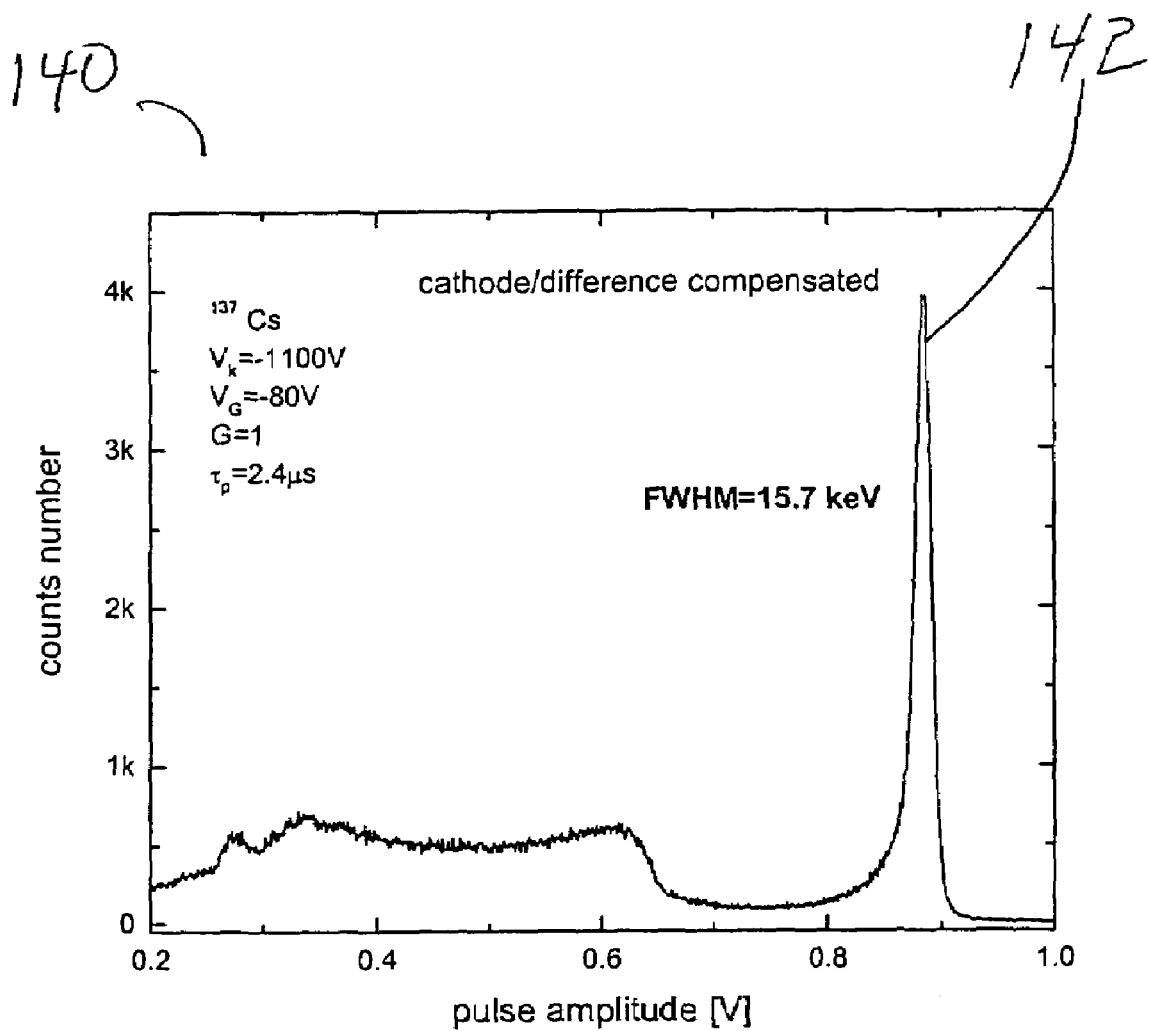
FIG. 7 is a plot of a measured spectrum of the $^{137}$Cs standard using the ASIC shown in FIG. 4, to apply the prior art the cathode/difference ratio technique.

In FIG. 7, results from measurements using the ASIC 80 and compensation techniques based on the cathode/difference ratio are shown, where the measured spectrum 140 of the same $^{137}Cs$ standard shows a pulse 142 with FWHM of about 15 keV, a significant improvement in resolution.

Figure 8:
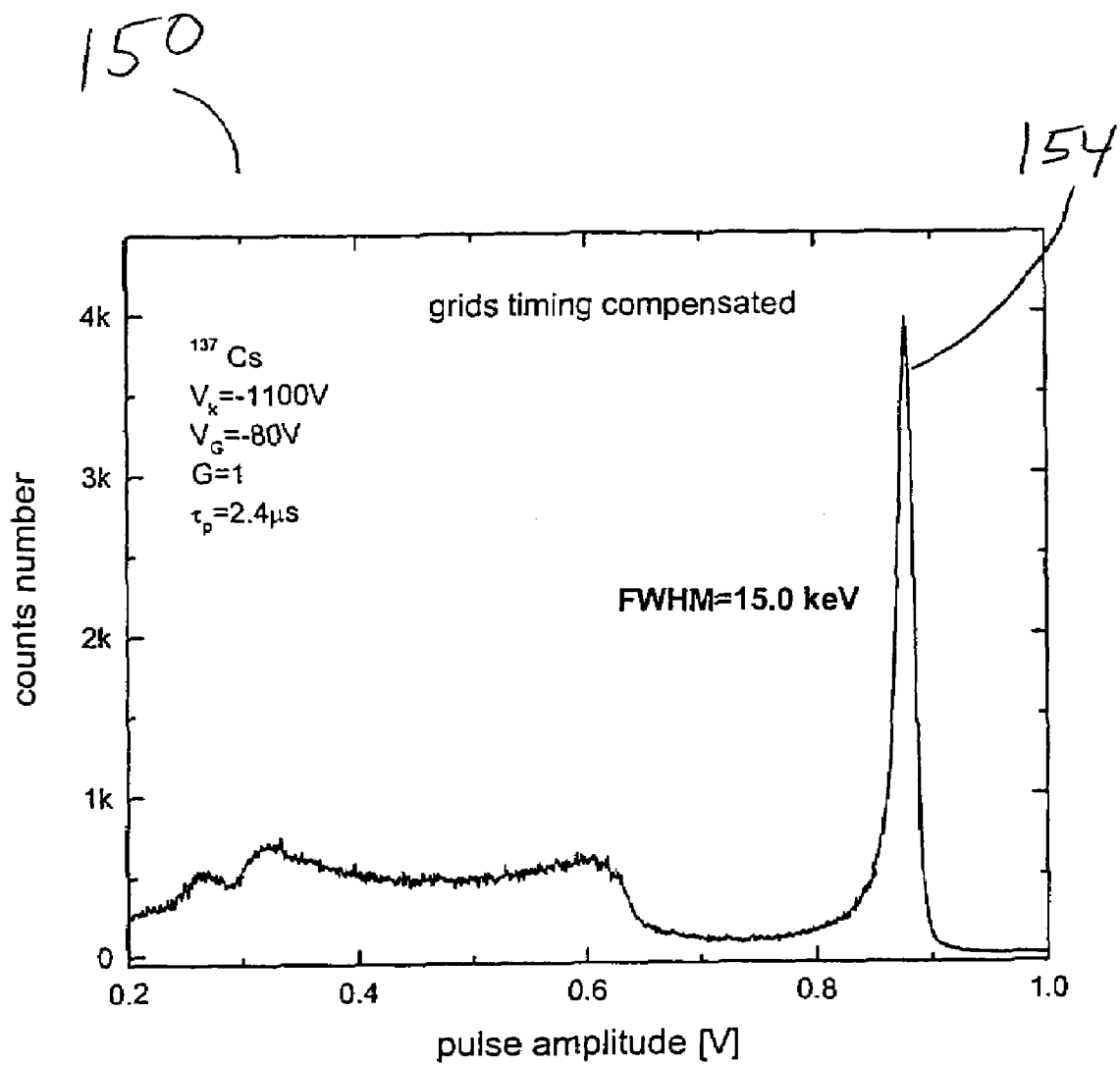
FIG. 8 is a plot of a measured spectrum of the $^{137}$Cs standard using the ASIC shown in FIG. 4, to apply the method of the present invention.

FIG. 8 also shows a spectrum 150 measured using the ASIC 80. However, in this case, the first timing signal 112 and the second timing signal 114 are used to measure the timing difference $t_d-t_c$ corresponding to the depth of interaction, according to the method of the present invention. A simple linear equation was applied for the compensation. The measured pulse 152 after the simple linear compensation was also measured to have a FWHM of about 15 keV, without the need for the high voltage bulky front-end electronics that are required to use a cathode input for the method applied to produce the pulse 142 in FIG. 7. Preferably, higher order equations are used as known to those skilled in the art to produce even better compensation.

Figure 9:
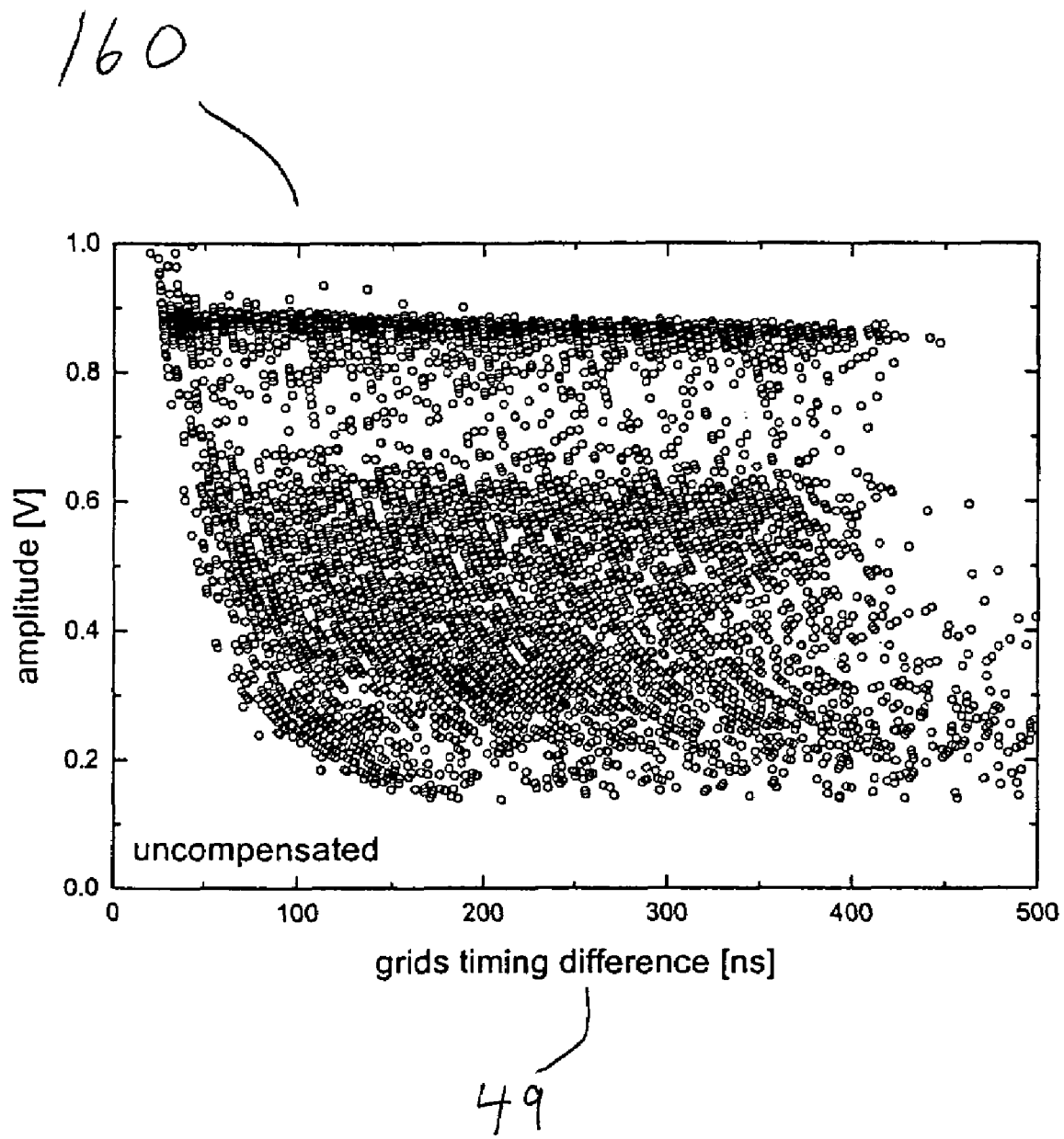
FIG. 9 is a bi-parametric spectrum of measurements of the $^{137}$Cs standard for different depths of interaction using the ASIC of FIG. 4 and applying the method of the present invention.

In FIG. 9, a bi-parametric spectrum 160 was measured relating the timing difference $t_d-t_c$ 49 (see also FIG. 3A) to the uncompensated amplitude of the shaped difference signal. The timing difference 49 is the difference between the timing signal 112 measuring time of occurrence $t_c$ 22 and timing signal 114 measuring time of detection $t_d$ 24 derived from the ASIC 80. The corresponding depth of interaction is successfully used to compensate for the electron trapping according to the method and device of the present invention at a resolution comparable to or better than the less efficient prior art devices.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

The invention claimed is:

1. A method of measuring a depth of interaction of an ionizing event using a co-planar collecting electrode and a non-collecting electrode, the method comprising:

obtaining a difference in time between a time of occurrence of an ionizing event as detected by one of the collecting electrode and the non-collecting electrode and a time of detection of a charge generated by the ionizing event at the collecting electrode; and calculating the depth of interaction of the ionizing event from the difference in time.

2. The method of claim 1, wherein said obtaining comprises:

providing a collecting electrode signal from the collecting electrode;

providing a non-collecting electrode signal from the non-collecting electrode;

measuring the time of occurrence of the ionizing event from the collecting electrode signal; and measuring the time of detection of the charge arriving at the collecting electrode.

3. The method of claim 2, wherein the collecting electrode signal comprises an event pulse generated by the ionizing event, the event pulse comprising an event leading edge occurring at the time of occurrence, and wherein said measuring the time of occurrence comprises:

comparing the collecting electrode signal to a first threshold reference level, wherein the first threshold reference level is set to correspond to the event leading edge; and recording a first time at which the collecting electrode signal crosses the first threshold reference level, wherein the first time corresponds to the time of occurrence.

4. The method of claim 3, wherein said measuring the time of detection comprises:

obtaining a difference signal between the non-collecting electrode signal and the collecting electrode signal, wherein the difference signal comprises a difference pulse with a leading edge occurring at the time of detection;

comparing the difference signal to a second threshold reference level, wherein the second threshold reference level is set to correspond to the leading edge of the difference signal; and recording a second time at which the difference signal crosses the second threshold reference level, wherein the second time corresponds to the time of detection.

5. The method of claim 4, wherein said obtaining the difference in time further comprises subtracting the first time from the second time.

6. The method of claim 4, wherein said obtaining the difference signal further comprises:

amplifying the collecting electrode signal and the non-collecting electrode signal; and inputting the amplified signals into a differential amplifier to obtain the difference signal.

7. The method of claim 4, wherein said comparing comprises:

inputting the collection electrode signal and the first threshold reference level to a first comparator, wherein a first output from the first comparator provides the first time; and inputting the difference signal and the second threshold reference level to a second comparator, wherein a second output from the second comparator provides the second time.

8. The method of claim 2, wherein the detected charge is an electron, wherein the collecting electrode is a collecting grid and the non-collecting electrode is a non-collecting grid, the method further comprising operating a co-planar grid sensor comprising the co-planar collecting grid and the non-collecting grid and a substrate at room temperature.

9. The method of claim 1, wherein said calculating comprises calculating the depth of interaction d according to:

$$d = a(t_d - t_c),$$

wherein $(t_d - t_c)$ is the difference in time, a is a weighting coefficient, $t_d$ is the time of detection, and $t_c$ is the time of occurrence.

10. The method of claim 9, the method adapted to provide a high-resolution ionizing radiation sensor, the method further comprising:

weighting the difference signal by applying a pulse height deficit correction using the calculated depth of interaction to improve a spectral resolution of detection of the ionizing event.

11. The method of claim 10, wherein said weighting comprises applying the pulse height deficit correction:

$$E_{corr} = E_{meas}(1 + b*d),$$

wherein b is a second weighting function, $E_{meas}$ is the difference signal and $E_{corr}$ is a corrected difference signal providing the improved spectral resolution.

12. A device for measuring a depth of interaction of an ionizing event using a co-planar anode electrode sensor comprising a coplanar non-collecting electrode and a collecting electrode, the device comprising:

a first channel for inputting a collecting electrode signal from a collecting electrode, the collecting electrode signal comprising an event pulse comprising an event leading edge occurring at a time of occurrence of an ionizing event;

a second channel for inputting a non-collecting electrode signal from a non-collecting electrode;

a differential amplifier operatively connected to the first channel and the second channel, wherein an output from the differential amplifier provides a difference signal between the non-collecting electrode signal and the collecting electrode signal, wherein the difference signal comprises a difference pulse comprising a leading edge occurring at a time of detection of a charge generated in response to the ionizing event;

a first comparator operatively connected to the collecting electrode and a first threshold control, the first threshold control providing a first threshold reference level adjusted to correspond to the event leading edge, wherein the first comparator outputs a first time at which the collecting electrode signal crosses the first threshold reference level, the first time corresponding to the time of occurrence; and a second comparator operatively connected to the output of the differential amplifier and a second threshold reference level adjusted to correspond to the leading edge of the difference pulse, wherein the second comparator outputs a second time at which the difference signal crosses the second threshold reference level, wherein the second time corresponds to the time of detection.

13. The device of claim 12, further comprising:

first front-end electronics in the first channel to process the collecting electrode signal comprising a first charge amplifier; and second front-end electronics in the second channel to process the non-collecting electrode signal comprising a second charge amplifier.

14. The device of claim 12, further comprising:

a shaping amplifier, wherein the difference signal is filtered by the shaping amplifier after inputting the difference signal to the second comparator.

15. The device of claim 12, wherein the device is integrated into an Application Specific Integrated Circuit.

16. The device of claim 12, wherein the detected charge is an electron, and wherein the collecting electrode is a collecting grid and the non-collecting electrode is a non-collecting grid in a co-planar grid sensor.

17. The device of claim 16, wherein the co-planar grid sensor is operated at room temperature and the ionizing event is a gamma-ray event.

18. The device of claim 16, wherein the co-planar grid sensor further comprises a substrate for detecting the ionizing event.

19. The device of claim 18, wherein the semiconductor comprises one of Cadmium Zinc Telluride, Cadmium Telluride and Mercuric Iodide.

20. The device of claim 12, further comprising a processor for calculating a timing difference, wherein the timing difference equals the second time minus the first time, and for calculating a depth of interaction of the ionizing event from the timing difference, wherein the processor further weights the difference signal by the calculated depth of interaction to improve a spectral resolution of the co-planar grid sensor.

21. In combination:
a co-planar anode electrode sensor, the sensor comprising:
a non-collecting anode electrode;
a collecting anode electrode, wherein the non-collecting anode electrode and the collecting anode electrode are co-planar;
a cathode; and
a substrate, wherein an ionizing event occurs at a depth of interaction in the substrate,
wherein a charge generated by the ionizing event is collected at the collecting anode electrode; and
a device for measuring a depth of interaction of an ionizing event using a co-planar anode electrode sensor, the device comprising:
a first channel for inputting a collecting electrode signal from a collecting electrode, the collecting electrode signal comprising an event pulse comprising an event leading edge occurring at a time of occurrence of an ionizing event;
a second channel for inputting a non-collecting electrode signal from a non-collecting electrode;
a differential amplifier operatively connected to the first channel and the second channel, wherein an output from the differential amplifier provides a difference signal between the non-collecting electrode signal and the collecting electrode signal, wherein the difference signal comprises a difference pulse comprising a leading edge occurring at a time of detection of a charge generated in response to the ionizing event;
a first comparator operatively connected to the collecting electrode and a first threshold control, the first threshold control providing a first threshold reference level adjusted to correspond to the event leading edge, wherein the first comparator outputs a first time at which the collecting electrode signal crosses the first threshold reference level, the first time corresponding to the time of occurrence; and
a second comparator operatively connected to the output of the differential amplifier and a second threshold reference level adjusted to correspond to the leading edge of the difference pulse, wherein the second comparator outputs a second time at which the difference signal crosses the second threshold reference level, wherein the second time corresponds to the time of detection.

22. The combination of claim 21, wherein the detected charge is an electron, and wherein the collecting electrode of the co-planar anode electrode sensor is a collecting grid and the non-collecting electrode is a non-collecting grid, and further wherein the co-planar anode electrode sensor is a co-planar grid sensor operated at room temperature.

23. The combination of claim 22, wherein the ionizing event is a gamma-ray event, and wherein the semiconductor comprises one of Cadmium Zinc Telluride, Cadmium Telluride and Mercuric Iodide.

24. The combination of claim 21, wherein the device is integrated into an Application Specific Integrated Circuit.

25. The combination of claim 21, wherein the device further comprises a processor for calculating a timing difference, wherein the timing difference equals the second time minus the first time, and for calculating the depth of interaction of the ionizing event from the timing difference, wherein the processor further weights the difference electrode signal by the calculated depth of interaction to improve a spectral resolution of the co-planar anode electrode sensor.

* * * * *